United States Patent [19]
Yamaguchi et al.

[11] Patent Number: 6,095,942
[45] Date of Patent: Aug. 1, 2000

[54] SPEED CHANGE CONTROL DEVICE FOR VEHICULAR CONTINUOUSLY VARIABLE TRANSMISSION

[75] Inventors: Masaaki Yamaguchi; Eiji Kitsutaka; Daihei Teshima; Hirotoshi Inoue, all of Saitama, Japan

[73] Assignee: Honda Giken Kogyo Kabushiki Kaisha, Tokyo, Japan

[21] Appl. No.: 09/356,507

[22] Filed: Jul. 19, 1999

[30] Foreign Application Priority Data

Aug. 18, 1998 [JP] Japan ................................. 10-231550

[51] Int. Cl.$^7$ .................................................. B60K 41/12
[52] U.S. Cl. ............................................ 477/40; 477/901
[58] Field of Search ........................ 477/40, 901

[56] References Cited

U.S. PATENT DOCUMENTS

| | | | |
|---|---|---|---|
| 4,671,138 | 6/1987 | nobumoto et al. | 477/901 |
| 5,611,748 | 3/1997 | Kashiwabara | 477/901 |
| 5,669,847 | 9/1997 | Kashiwabara | 477/901 |
| 5,913,746 | 6/1999 | Bauerle | 477/901 |

FOREIGN PATENT DOCUMENTS 59-219557  12/1984  Japan ................................. F16H 9/18

*Primary Examiner*—Dirk Wright
*Attorney, Agent, or Firm*—Sughrue, Mion, Zinn, Macpeak & Seas, PLLC

[57] ABSTRACT

In a continuously variable transmission, a speed change control device includes a vehicle speed sensor, a brake sensor, a release vehicle speed memory which, when the brake is operated, renews and stores the brake release vehicle speed, and a gradient sensor for detecting a running road gradient. When, in an engine brake running state, the present vehicle speed is higher than the brake release vehicle speed stored in the release vehicle speed memory, a speed change target value is obtained according to the difference between the present vehicle speed and the brake release vehicle speed and to the road gradient. And, when, in the same state, the present vehicle speed is lower than the brake release vehicle speed, the speed change target value is obtained according to the road gradient. The speed change control is carried out so as to obtain the speed change target value.

7 Claims, 7 Drawing Sheets

SPEED CHANGE CONTROL DEVICE FOR VEHICULAR CONTINUOUSLY VARIABLE TRANSMISSION

BACKGROUND OF THE INVENTION

1. Field of the Invention

This invention relates to a device for performing speed change control in a vehicular continuously variable transmission which transmits the output of the engine to the running drive wheels in a state of a continuously variable change speed, and more particularly to a device having a specific feature in the control of speed change during a braking operation.

2. Description of the Related Art

In a conventional method of performing speed change control in a vehicle on which a continuously variable transmission, a target engine speed (rpm) is mounted in correspondence to an index indicating the acceleration will of the driver (such as an engine throttle opening degree, and the amount of depression of the acceleration pedal, hereinafter, these are referred to merely as "acceleration opening degree"), and the actual engine speed is made close to the target engine speed (rpm). Japanese Patent Unexamined Publication No. Sho. 59-219557 has disclosed a speed change ratio control device in a vehicular continuously variable transmission which performs the above-described speed change control.

In the above-described device (disclosed by Japanese Patent Unexamined Publication No. Sho-59-219557), in the case where an engine brake state is established, for instance, when the vehicle runs down a slope, the speed change control is carried out in such a manner that the vehicle speed is kept constant. In this control operation, a vehicle speed which has been previously determined and stored is employed, or a vehicle speed which is obtained when a braking operation is carried out while the vehicle runs down a slope.

The engine brake running state occurs generally when the vehicle runs down a slope. The running performance required by the driver depends on the gradient of the slope. Hence, it is difficult for the above-described speed change control that the vehicle speed is kept constant to meet the requirement provided by the driver. For instance, one requirement is as follows: In the case where the gradient of a slope is low, the running is made at a relatively high speed with a small engine braking force, and in the case where the gradient of a slope is high, the running is made at a low speed with a great engine braking force. And, another requirement is as follows: In the case where the slope has many corners such as a mountain road, it is necessary to run the vehicle at a relatively low speed, and when the vehicle runs down the straight slope, it is required to run the vehicle at a relatively high speed.

SUMMARY OF THE INVENTION

In view of the foregoing, an object of the invention is to provide a speed change control device for a vehicular continuously variable transmission with which speed change control is effected in such a manner that, when a vehicle runs down a slope, the running is carried out according to the driver's desire with the gradient of the slope taken into account.

The foregoing object of the invention has been achieved by the provision of a speed change control device for a vehicular continuously variable transmission (such as a belt-type continuously variable transmission CVT in an embodiment of the invention (described later)) which transmits the output of an engine to the running drive wheels in a state of a continuously variable change speed, which includes: vehicle speed detecting means (such as a vehicle speed sensor in the embodiment); throttle opening degree detecting means (such as a throttle opening degree sensor in the embodiment); brake operation detecting means (such as a brake sensor in the embodiment); brake vehicle speed memory means (such as a release vehicle speed memory in the embodiment) which, when a brake is operated, renews and stores a vehicle speed as a brake release vehicle speed which is detected when the brake is operated; and gradient detecting means (such as a gradient sensor in the embodiment) for detecting the gradient of a road on which a vehicle runs, and in which when, in the case where the fact that the brake is not operated is detected, and the fact that a throttle is substantially fully opened is detected, the present vehicle speed detected by the vehicle speed detecting means is higher than a brake release vehicle speed stored in the brake vehicle speed memory means (that is, when a vehicle speed increases), a speed change target value is obtained according to the difference between the present vehicle speed and the brake release vehicle speed, and to a road gradient detected by the gradient detecting means, and when, in the same case, the present vehicle speed is lower than the brake release vehicle speed (that is, when the vehicle speed decreases), a speed change target value is obtained according to the present road gradient, and speed change control is carried out so as to obtain the speed change target value. As long as the brake operation is effected, the brake vehicle speed memory means renews and stores the current vehicle speed as a brake release vehicle speed. Therefore, in the case where the brake operation is not effected, the vehicle speed is stored which is provided at the time of the brake release which occurred immediately before.

The speed change control device designed as described above, functions as follows: Let us consider the case where, when a vehicle runs downs a slope, the acceleration pedal is released, and the acceleration opening degree is zeroed, so that the vehicle runs in the engine brake mode (in an engine brake running state). In this case, as long as, after the brake pedal is depressed and then released, the vehicle speed is not increased, the speed change target value (for instance a target engine speed (rpm)) is determined according to the running road gradient. Therefore, the speed change target value suitable for the gradient of the running road on which the vehicle runs is determined, and the speed change control is suitably carried out which agrees with the driver's desire.

On the other hand, when, after the brake pedal is depressed and then released, the vehicle speed increases, the speed change target value is determined according to the difference between the present vehicle speed and the brake release vehicle speed and to the present road gradient detected by the gradient detecting means. Therefore, in the case where the vehicle runs down a steep down-hill gradient road in the engine brake mode, and the vehicle speed increases, the control is carried out that corrects the speed change control value which changes the speed change ratio to the LOW side (for instance, the control that increases the target engine speed (rpm)), and the engine brake force is increased, so that the vehicle running characteristic is obtained which agrees with the driver's desire.

DETAILED DESCRIPTION OF THE PREFERRED EMBODIMENTS

A preferred embodiment of the invention will be described with reference to the accompanying drawings.

Figure 1:
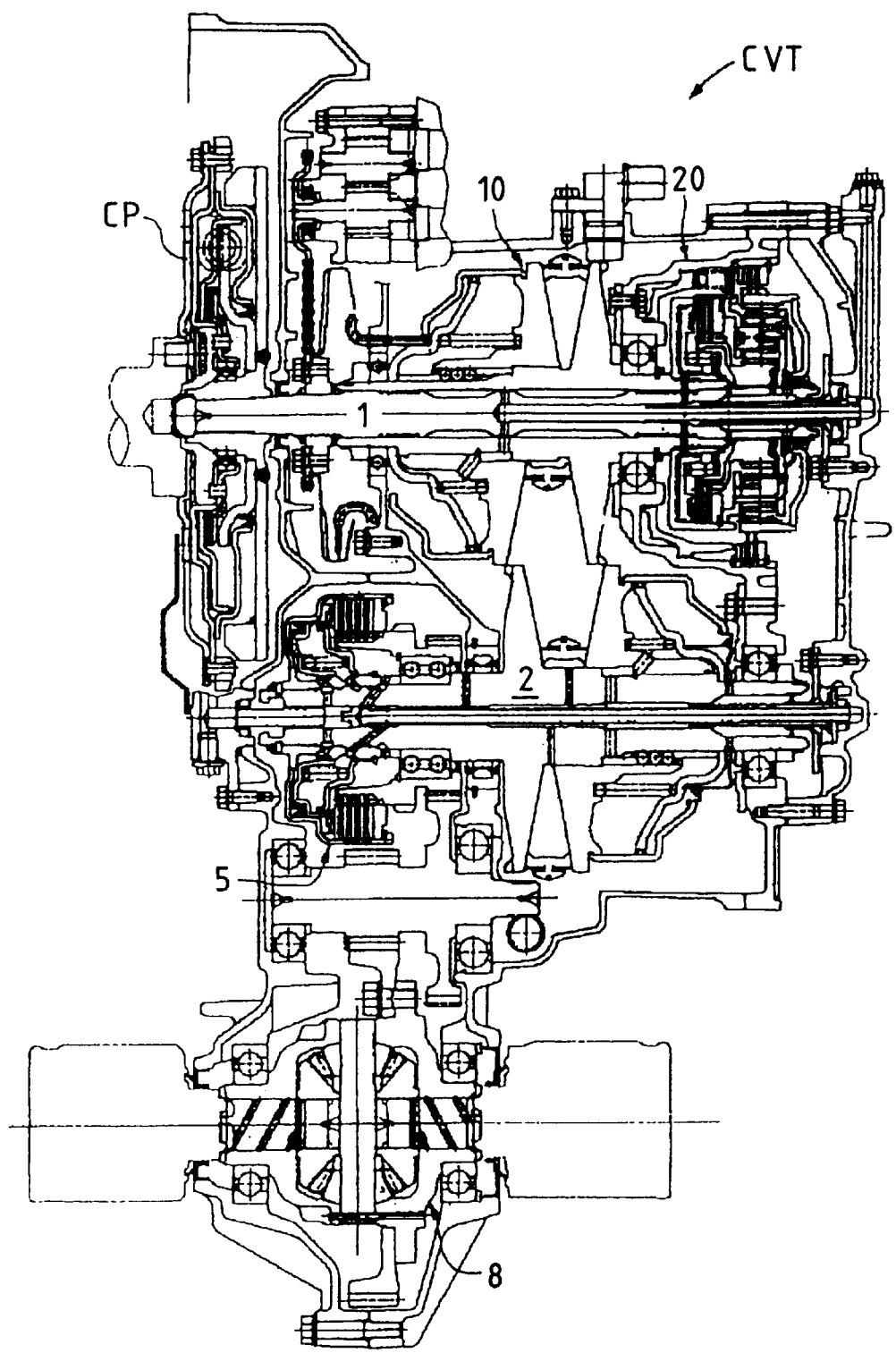
FIG. 1 is a sectional view showing the arrangement of a continuously variable transmission whose speed change control is carried out by a speed change control device according to the invention.
Figure 2:
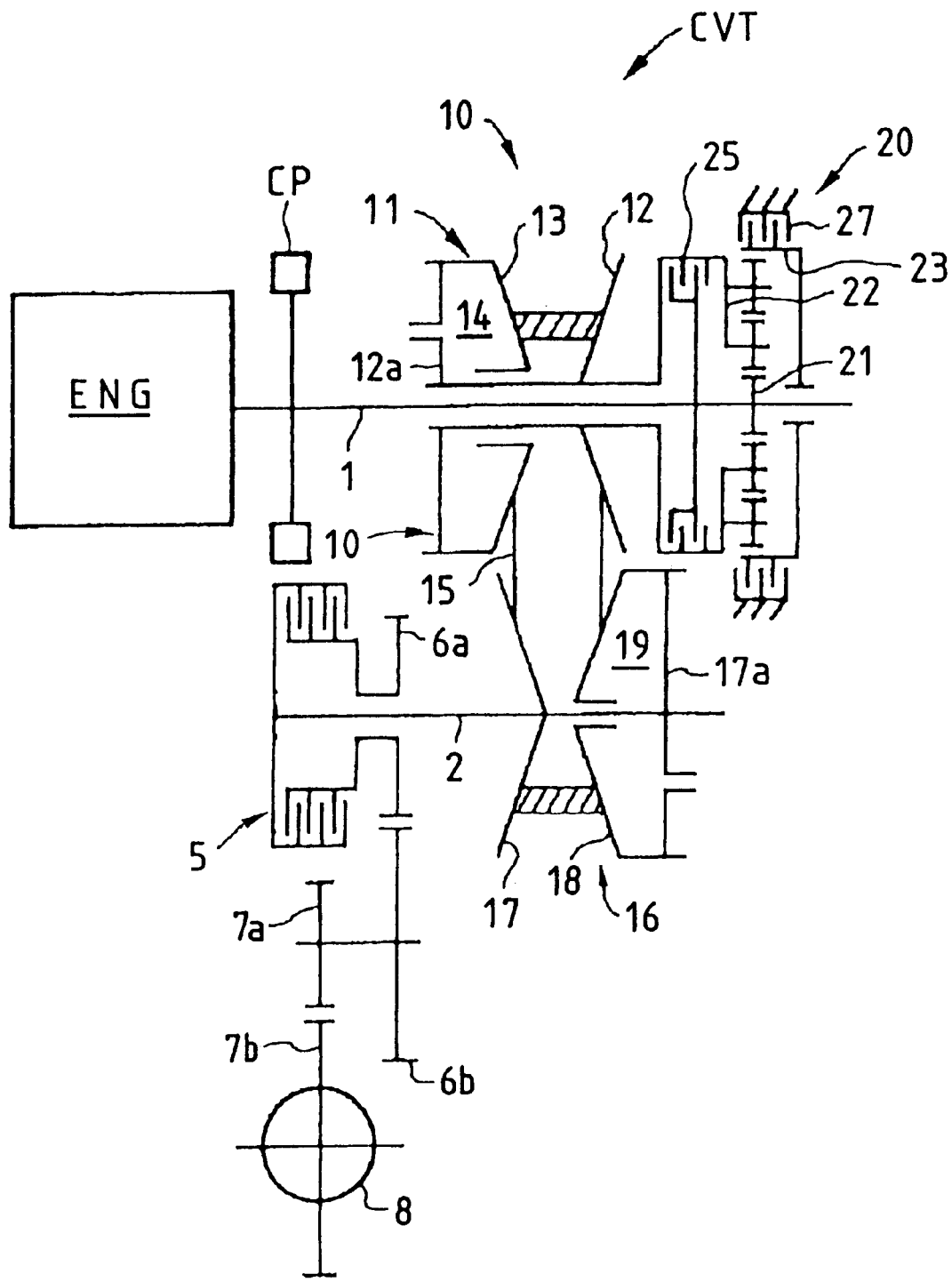
FIG. 2 is an explanatory diagram outlining the power transmission system of the continuously variable transmission.

FIGS. 1 and 2 show the arrangement of a belt-type continuously variable transmission in which speed change control is carried out by a speed change control device according to the invention.

The belt-type continuously variable transmission CVT includes: a metal V-belt mechanism 10 arranged between an input shaft 1 and a counter shaft 2; a planetary-gear-type forward and backward switching mechanism 20 which is arranged between the input shaft 1 and a drive side movable pulley 1, and a main clutch 5 arranged between the counter shaft 2 and an output member (such as a differential mechanism 8). The continuously variable transmission CVT is adopted for a vehicle. The input shaft 1 is coupled through a coupling mechanism CP to the output shaft of the engine ENG, and the drive power transmitted to the differential mechanism is transmitted to the right and left drive wheels.

The metal V-belt mechanism 10 includes a drive side pulley 11 arranged on the input shaft 1, a driven side pulley 16 arranged on the counter shaft 2, and a metal V-belt 15 laid over those two pulleys 11 and 16.

The drive side pulley 11 includes a stationary pulley half 12 rotatably provided on the input shaft 1, and a movable pulley half 13 which is axially movable with respect to the stationary pulley half 12. On a side of the movable pulley half 13, a drive side cylinder chamber 14 is formed by being surrounded by a cylinder wall 12a coupled to the stationary pulley half 12. An oil pressure Pdr is supplied into the drive side cylinder chamber 14, to produce a side pressure for moving the movable pulley half 13 axially; that is, a drive side pulley axial thrust force.

The driven side pulley 16 includes a stationary pulley half 17 secured to the counter shaft 2, and a movable pulley half 18 which is movable with respect to the stationary pulley half 17 axially. On a side of the movable pulley half 18, a driven side cylinder chamber 19 is formed by being surrounded by a cylinder wall 17a coupled to the stationary pulley half 17. An oil pressure Pdn is supplied into the drive side cylinder chamber 19, to provide a side pressure for moving the movable pulley half 18 axially; that is, a driven side pulley axial thrust force.

Hence, by suitably controlling the oil pressures Pdr and Pdn supplied to the cylinder chambers 14 and 19, a pulley side pressure is obtained without slip of the belt 15, and the pulleys 11 and 16 can be changed in pulley width. Accordingly, by changing the winding radius of the V-belt 15, the change gear ratio i can be continuously changed.

The planetary-gear-type forward and backward switching mechanism 20 has a double-pinion-type planetary gear train, and its sun gear 21 is coupled to the input shaft 1, and its carrier 22 is coupled to the stationary pulley half 12, and its ring gear 23 can be fixedly held by a backward brake 27. Furthermore, the mechanism 20 has a forward clutch 25 which is able to couple the sun gear 21 and the ring gear 23 to each other. Upon engagement of the forward clutch 25, all the gears 21, 22 and 23 are turned together with the input shaft 1, and the drive side pulley 11 is driven in the same direction (in the forward direction) as the input shaft 1. On the other hand, upon engagement of the backward brake 17, the ring gear 23 is fixedly held, so that the carrier 22 is driven in the direction opposite to the direction in which the sun gear 21 is driven, and the drive side pulley 11 is driven in the direction (the backward direction) opposite to the direction in which the input shaft 1 is driven.

The main clutch 5 is to control the transmission of power between the counter shaft 2 and the output side member, and during the engagement thereof, the power is transmitted between the counter shaft 2 and the output side member. And, by controlling the engaging force, the capacity of transmission of torque (or torque capacity) between the input side and the output side is controlled. Therefore, at the time of engagement of the main clutch 5, the engine output speed-changed by the metal V-belt mechanism 10 is transmitted through gears 6a, 6b, 7a and 7b to the differential mechanism 8, and then to the right and left wheels (not shown) through the differential mechanism 8. When the main clutch 5 is released, the drive power transmission is not effected, and the speed changer is placed in the neutral state.

The speed change control device is to control the oil pressures Pdr and Pdn in the drive side cylinder chamber 14 and the driven side cylinder chamber 19 thereby to control the thrust forces of the drive side pulley and the driven side pulley. That is, the speed change control device is to suitably perform the speed change control while setting a minimum and necessary thrust force without belt slip. The control is carried out by the speed change control device according to the invention. The device and the control will be described in detail.

Figure 3:
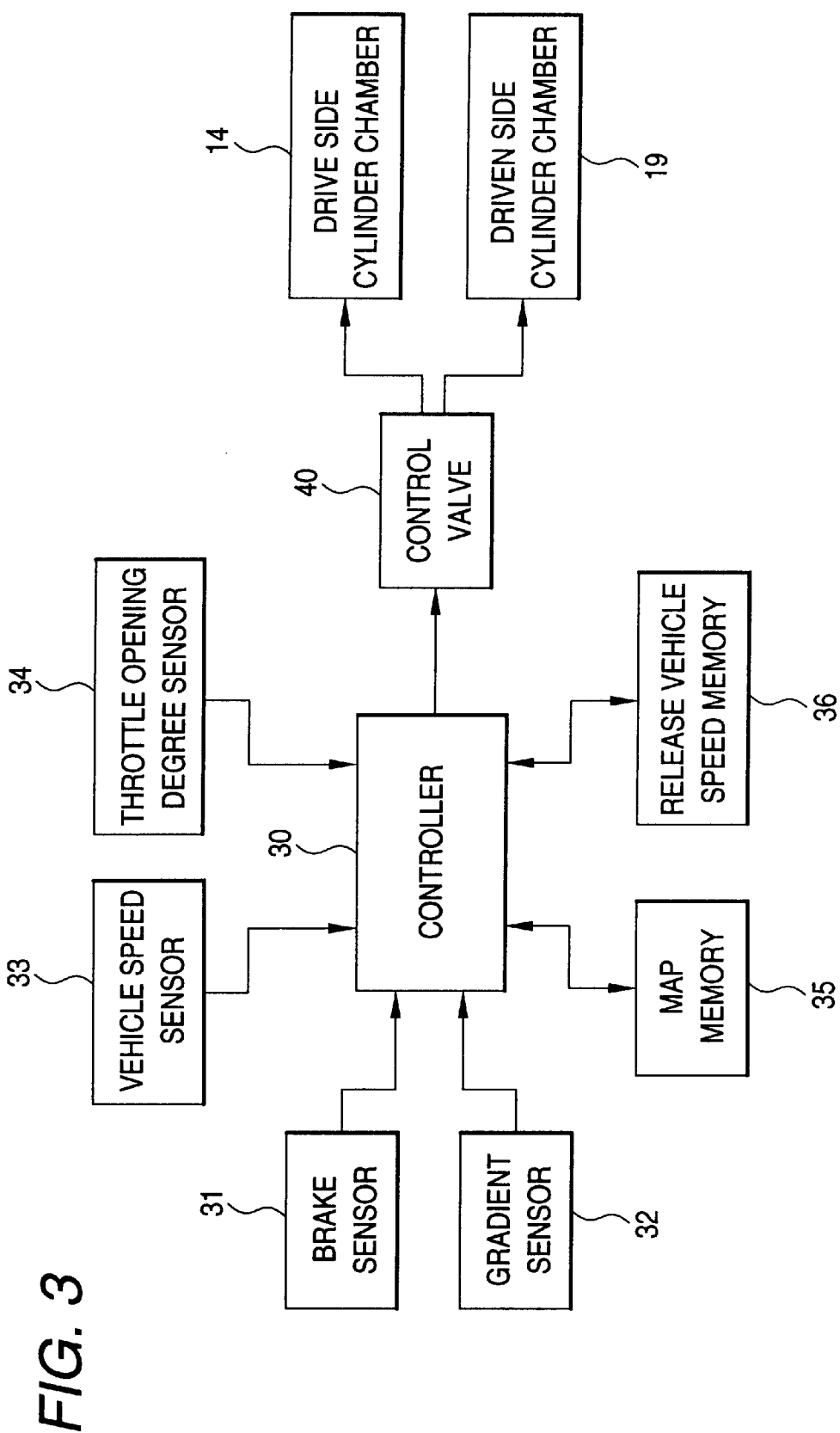
FIG. 3 is a block diagram showing the arrangement of the speed change control device according to the invention.

FIG. 3 shows the arrangement of the speed change control device. The device includes a control valve 40 for controlling oil pressures Pdr and Pdn applied to the drive side cylinder chamber 14 and the driven side cylinder chamber 19, and a controller 30 for controlling the operation of the control valve 40. The controller 30 receives a detection signal from a brake sensor 31 adapted to detect the operation of the brake, a detection signal from a gradient sensor 32 adapted to detect the gradient of a road on which a vehicle runs, a detection signal from a vehicle speed sensor 33 adapted to detect a vehicle running speed, and a detection signal from a throttle opening degree sensor 34 adapted to detect a throttle opening degree. Furthermore, a map memory 35 storing a speed change map, and a release vehicle speed memory 36 renewing and storing a vehicle speed at the time of release of the brake are connected to the controller 30. By using the detection signals of the above-described sensors and the contents of the memories 35 and 36, the operation of the control value 40 is controlled; that is, the speed change control is carried out.

Figure 4:
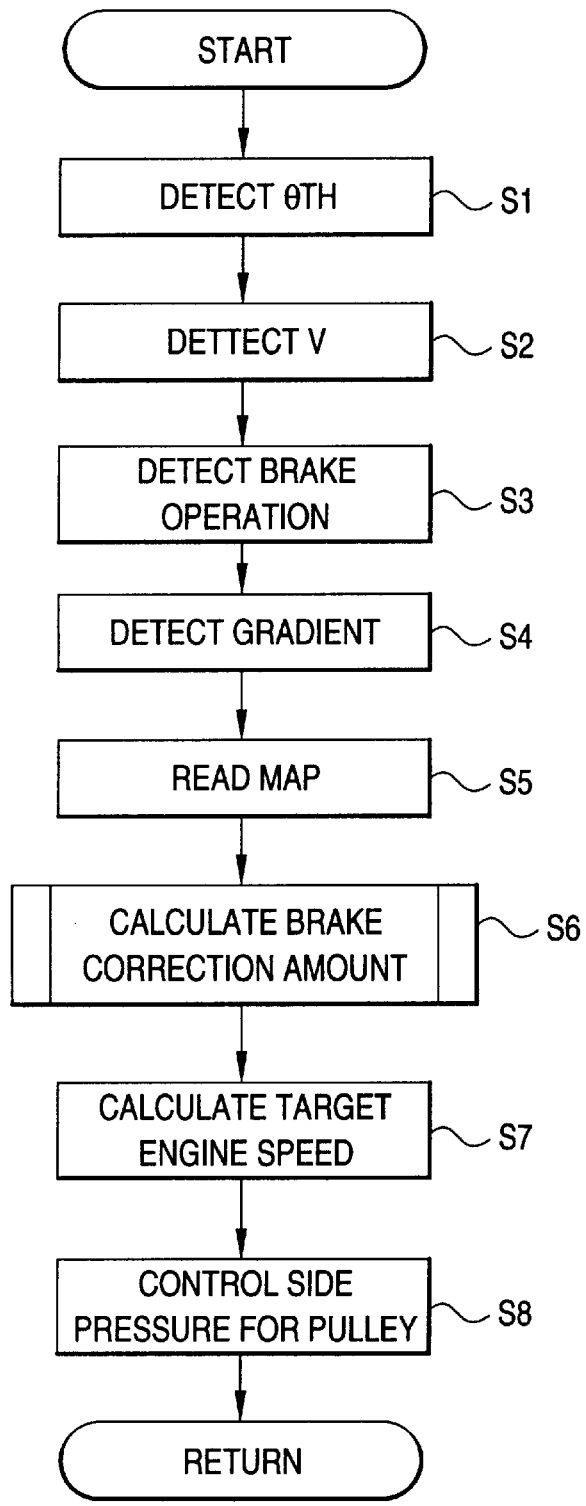
FIG. 4 is a flow chart showing the contents of the speed change control by the speed change control device of the invention.

The contents of the speed change control will be described with reference to a flow chart of FIG. 4. In the control, first an engine throttle opening degree θTH is detected with the throttle opening degree sensor 34 (Step S1). When the engine throttle opening degree θTH≠0; that is, in the state that the acceleration is on, the throttle flag F(TH) is set to 1 (F(TH)=1); and when the detected engine throttle opening degree θTH is 0 (OθH=0), that is, when the acceleration is off, the throttle flag F(TH) is set to 0 (F(TH)=0). Furthermore, in Step S2, the present vehicle running speed V(AC) is detected with the vehicle speed sensor 33.

In Step S3, it is detected with the brake sensor 31 whether or not the brake operation is effected. When the brake operation is effected, the brake flag F(BR) is set to 1 (F(BR)=1); and when the brake operation is not effected, the brake flag is set to 0 (F(BR)=0). And, in Step S4, the gradient of the road on which the vehicle is running is detected with the gradient sensor 32.

Figure 5:
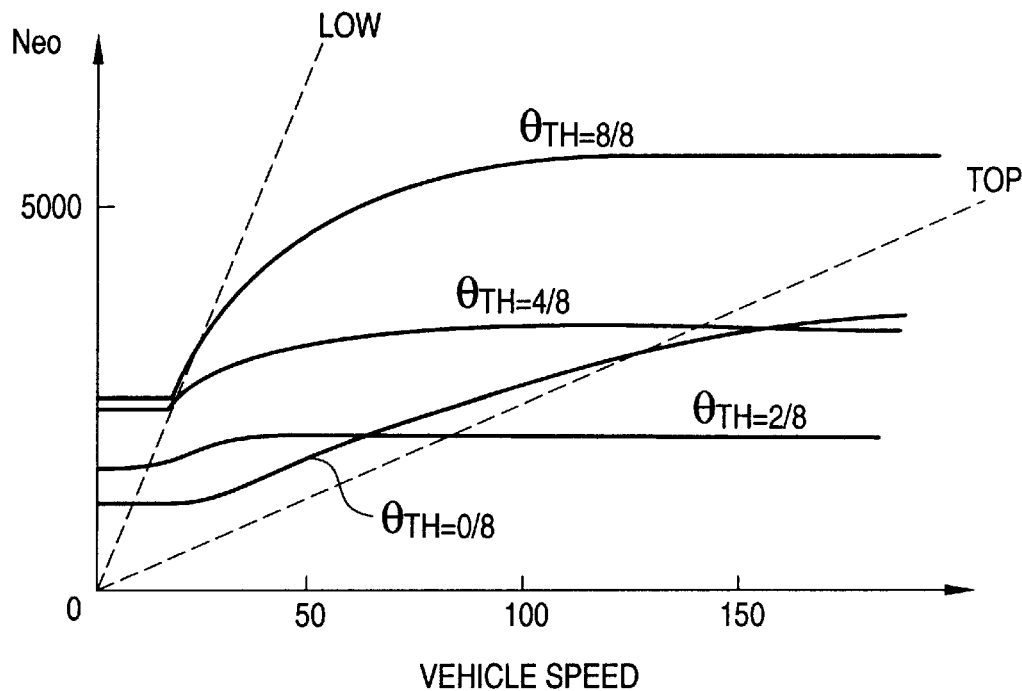
FIG. 5 is a graphical representation indicating a speed change map (for a slight down-hill gradient road) employed for the speed control.
Figure 6:
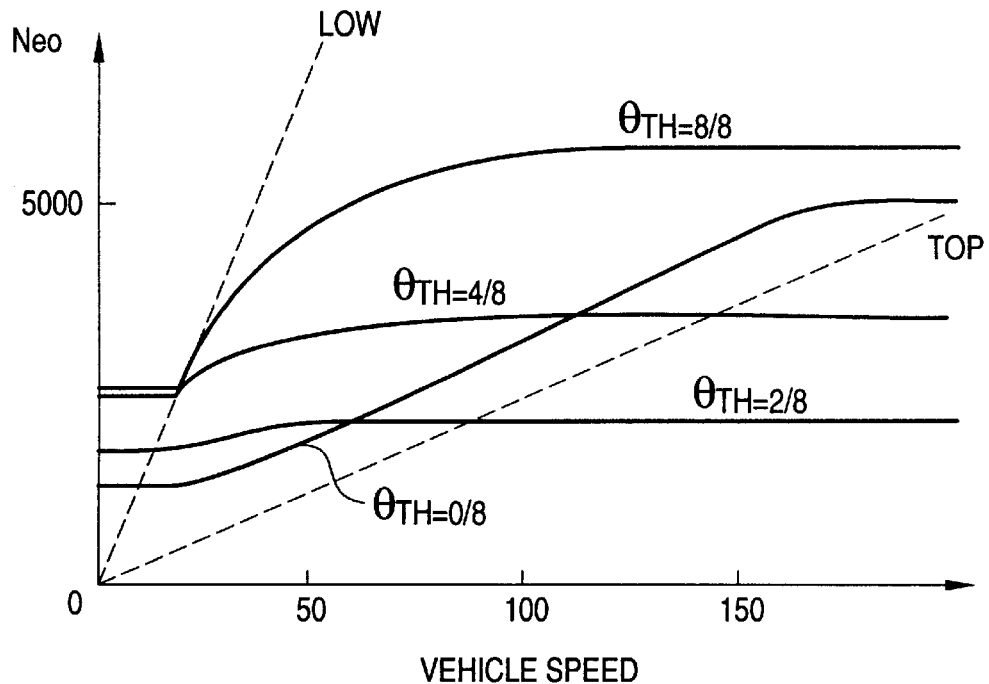
FIG. 6 is a graphical representation indicating a speed change map (for a middle down-hill gradient road) employed for the speed control.
Figure 7:
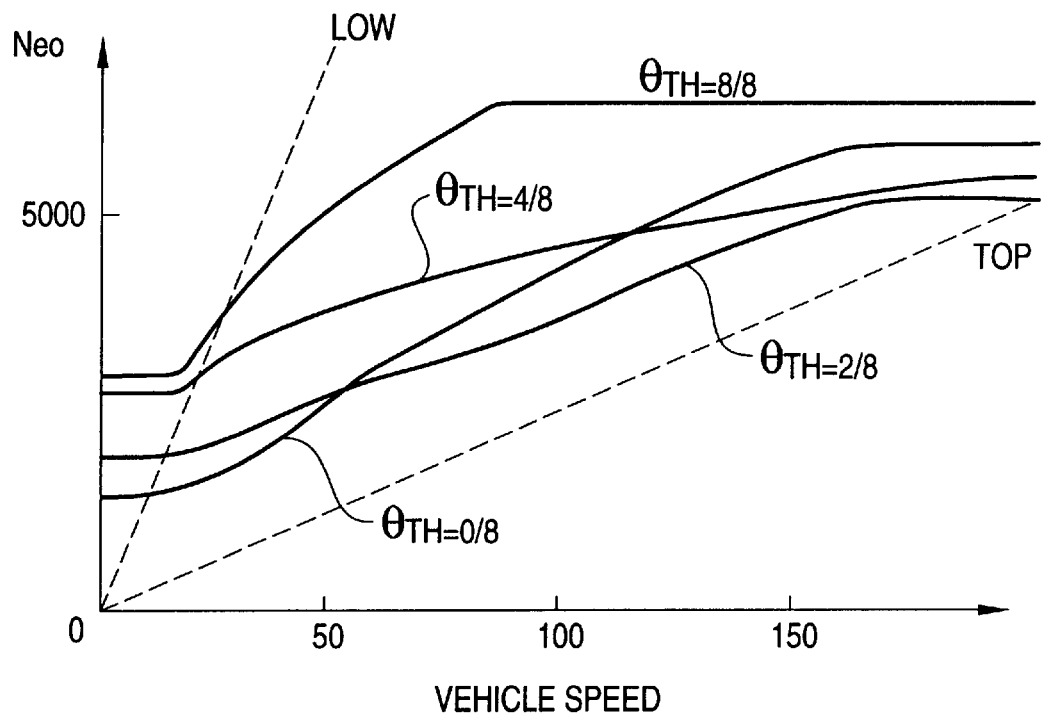
FIG. 7 is a graphical representation indicating a speed change map (for a steep down-hill gradient road) employed for the speed control.

And, a speed change map corresponding to the road gradient thus detected is read from the map memory 35 (Step S5). In the map memory 35, a plurality of speed change maps have been stored in correspondence to road gradients. A speed change map corresponding to the present road gradient is read from the map memory. The speed change maps include, for instance, a speed change map for a slight down-hill gradient (FIG. 5), speed change map for a middle down-hill gradient (FIG. 6), a speed change map for a steep down-hill gradient (FIG. 7), a speed change map for a horizontal flat road (not shown), and speed change maps for various up-hill gradients. Those maps have been previously determined and stored. Among those speed change maps, one corresponding to the present road gradient is read. En the speed change maps, as shown in FIGS. 5 through 7, target engine speeds (rpm) Neo are determined according to engine throttle opening degrees θTH and vehicle speeds. From this map, a target engine speed Neo is read which corresponds to the present vehicle speed V(AC) and the actual engine throttle opening degree θTH.

Figure 8:
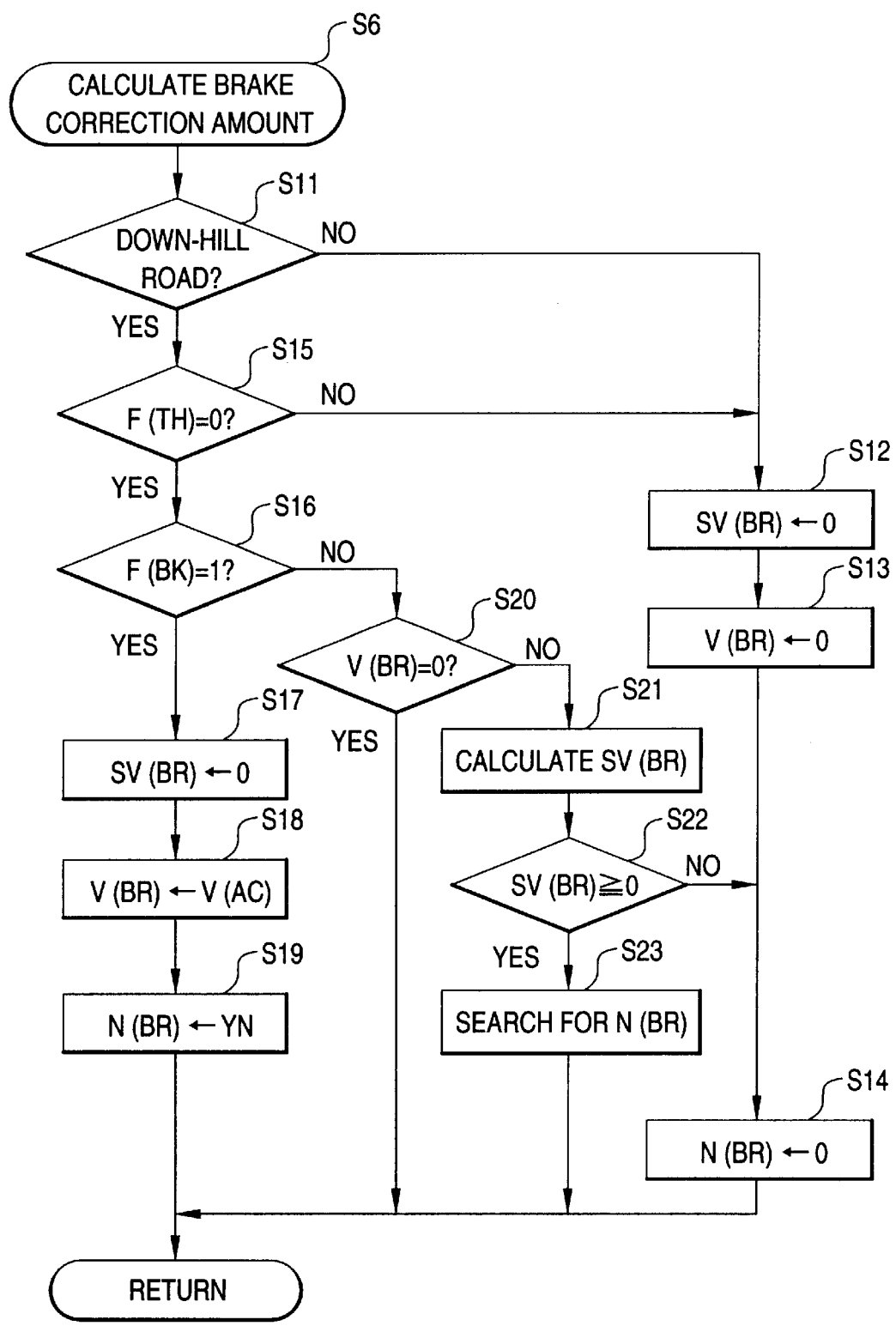
FIG. 8 is a flow chart for a description of the contents of a brake correction amount calculating sub-routine in the flow chart of FIG. 4.

Next, in Step S6, an amount of correction of a target engine speed Neo, namely, a brake correction amount N(BR) is calculated. The content of calculation in Step S6 is as shown in FIG. 8, a flow chart, and will be described with reference to FIG. 8.

First, in Step S11, it is determined whether or not the present road gradient is of down-hill gradient. The brake correction amount N(BR) is a value which is set when the vehicle runs down a road (a down-hill gradient road). Therefore, in the case where it is determined that the road is flat and horizontal or of up-hill gradient, then Steps S12, S13 and S14 are effected. That is, the vehicle speed deviation SV(BR) is set to zero (SV(BR)=0), the brake release vehicle speed V(BR) is set to zero (V(BR)=0), and the brake correction amount N(BR) is also set to zero (N(BR)=0). In other words, those values are reset, and the operation (flow) is ended.

On the other hand, when it is determined that the road is of down-hill gradient, Step S15 is effected. In Step S15, it is determined whether or not the throttle flag F(TH) is zero (0); that is, it is detected whether or not the acceleration is off. When, even if the road is of down-hill gradient, the acceleration is on; that is, the acceleration pedal is depressed, the driver's will is of acceleration, and therefore in this case, too, Steps S12, S13 and S14 are effected, so that the vehicle speed deviation SV(BR) is set to zero (SV(BR)=0), the brake release vehicle speed V(BR) is set to zero (V(BR)=0), and the brake correction amount N(BR) is also set to zero (N(BR)=0). Thus, the operation (flow) is ended.

In the case where the acceleration is off (θTH=0) while the vehicle runs down the down-hill gradient road, Step S16 is effected, so that it is determined whether or not the brake flag F(BR) is 1; that is, it is determined whether or not the brake is operated. When F(BR)=1; that is, when the brake is operated, the vehicle speed deviation SV(BR) is set to 0 (Step S17), and the present vehicle speed V(AC) detected by the vehicle speed sensor 33 is renewed and set as a brake release vehicle speedV(BR). And, a constant value YN (for instance 300 rpm) is set as a brake correction amount N(BR). The constant value YN is a value which is set to increase the target engine speed Neo to an extent when the brake is operated.

Thereafter, when the brake operation is released, in the next routine the operation is advanced from Step 16 to Step 20, so that it is determined whether or not the brake release vehicle speed V(BR) is 0. The brake release vehicle speed V(BR) is 0 until the brake is operated. In this case, the operation (flow) is ended. On the other hand, in the case where the brake is operated at least once, and then the brake release vehicle speed V(BR) is set, Step S21 is effected. In Step S18, since the actual vehicle speed V(AC) is renewed and stored, the vehicle speed detected by the vehicle speed sensor 33 at the time of release of the brake is stored, as a brake release vehicle speed V(BR), in the release vehicle speed memory 36.

Figure 9:
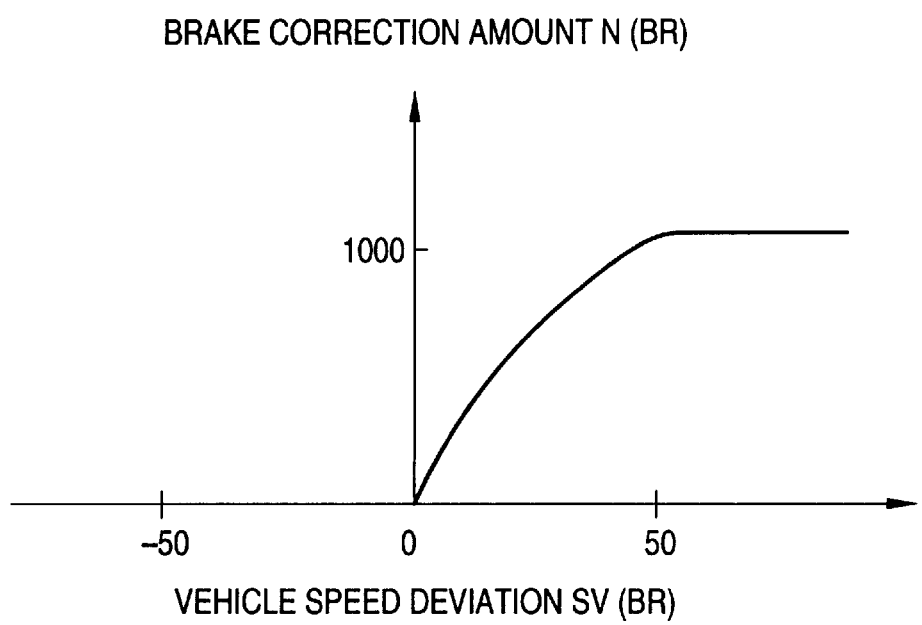
FIG. 9 is a graphical representation indicating vehicle speed deviations SV(BR) and brake correction amounts N(BR).

In Step S21, the vehicle speed deviation SV(BR) between the brake release vehicle speed V(BR) stored in the release vehicle speed memory 36 and the present vehicle speed V(AC) detected by the vehicle speed sensor 33 is calculated; and in Step S22, it is determined whether or not the vehicle speed deviation SV(BR) is equal to or larger than 0 ((SV(BR)≧0). When (SV(BR)≧0; that is, when the vehicle speed increases, Step S23 is effected, so that a brake correction amount N(BR) corresponding to the vehicle speed deviation SV(BR) is obtained. The brake correction amount N(BR) is a value for correctively increasing the target engine speed Neo, and is pre-set in correspondence to the vehicle speed deviation SV(BR) in advance, as shown in FIG. 9. And, in Step S23, from the table thus determined, a brake correction amount N(BR) corresponding to the present vehicle speed deviation SV(BR) is obtained. When SV(BR) <0; that is, when the vehicle speed decreases, Step S14 is effected, so that the brake correction amount N(BR) is set to 0.

When the brake correction amount N(BR) is obtained in the above-described manner, Step S7 (FIG. 4) is effected. In Step S7, the brake correction amount N(BR) is added to the target engine speed Neo read from the speed change map in Step S5 and corresponding to the present vehicle speed V(AC) and the actual engine throttle opening degree θTH, thereby to correct the target engine speed Neo.

When the target engine speed Neo thus corrected is obtained, the speed change control is so carried out that the present engine speed Nea is equal to the corrected target engine speed Neo. Specifically, in step S8, the oil pressures Pdr and Pdn of the drive side and driven side cylinder chambers 14 and 19 are controlled with the control valve 40; that is, the speed change control is carried out.

In the above-described embodiment, the technical concept is applied to the metal V-belt type continuously variable transmission; however, the invention is not limited thereto or thereby; that is, the technical concept of the invention may be applied to continuously variable transmissions of other types.

As was described above, according to the invention, when, in the engine brake running mode, the present vehicle speed is higher than the brake release vehicle speed stored in the brake vehicle speed memory means (that is, the vehicles speed increases), the speed change target value is obtained according to the difference between the present vehicle speed and the brake release vehicle speed and to the present road gradient detected by the gradient detecting means. Therefore, in the case where, for instance, the vehicle runs down the down-hill gradient road in the engine brake running mode with the acceleration pedal released and with the acceleration opening degree zeroed (that is, in the engine brake running state), as long as the vehicle speed is not increased after the brake pedal is depressed and then released, the speed change target value (for instance, the target engine speed (rpm)) is determined according to the running road gradient; that is, the speed change target value is determined which is suitable for the gradient of the road on which the vehicle runs. Thus, the speed change control is suitably carried out which agrees with the driver's desire.

On the other hand, in the case where, in the engine brake running state, the present vehicle speed is lower than the brake release vehicle speed (that is, when the vehicle speed decreases), the speed change target value is obtained from the present road gradient. Therefore, when the vehicle speed increase after, in the engine brake running state, the brake pedal is depressed once and then released, the speed change target value is determined according to the difference between the present vehicle speed and the brake release vehicle speed and to the present road gradient detected by the gradient detecting means, so that the vehicle runs down the steep down-hill gradient road in the engine brake mode. However, in the case where the vehicle speed increases, the control is carried out that corrects the speed change control value which changes the speed change ratio to the LOW side (such as the control that increases the target engine speed); that is, the engine brake force is increased to perform the speed change control having the vehicle running characteristic which agrees with the driver's desire.

The present disclosure relates to the subject matter contained in Japanese patent application No. Hei. 10-231550 filed on Aug. 18, 1998 which is expressly incorporated herein by reference in its entirety.

What is claimed is:

1. A speed change control device for a vehicular continuously variable transmission which transmits the output of an engine thus changed to drive wheels in a state of a continuously variable change speed, said control device comprising:

vehicle speed detecting means for detecting a vehicle speed;

throttle opening degree detecting means for detecting a throttle opening degree;

brake operation detecting means for detecting a brake operation;

brake vehicle speed memory means which, when the brake operation is detected by said brake operating detecting means, renews and stores the vehicle speed as a brake release vehicle speed which is detected by said vehicle speed detecting means when the brake is operated; and gradient detecting means for detecting the gradient of a road on which a vehicle runs, wherein, in the case where the fact that the brake is not operated is detected by said brake operation detecting means, and the fact that a throttle is substantially fully closed is detected by said throttle opening degree detecting means, when the present vehicle speed detected by said vehicle speed detecting means is higher than the brake release vehicle speed stored in said brake vehicle speed memory means, a speed change target value is obtained according to the difference between said present vehicle speed and said brake release vehicle speed, and to the road gradient detected by said gradient detecting means, and in the same case, when the present vehicle speed detected by said vehicle speed detecting means is lower than the brake release vehicle speed stored in said brake vehicle speed memory means, the speed change target value is obtained according to the road gradient detected by said gradient detecting means, and speed change control is carried out so as to obtain the speed change target value.

2. A speed change control device according to claim 1, further comprising:

a map memory means storing a plurality of maps corresponding to the road gradients, wherein the map corresponding to the road gradient detected by said gradient detecting means is selected, a target engine speed is determined from the present vehicle speed and the throttle opening degree on the selected map, and when the present vehicle speed detected by said vehicle speed detecting means is higher than the brake release vehicle speed stored in said brake vehicle speed memory means, the speed change target value is obtained from the target engine speed and a brake correction amount corresponding to the difference between said present vehicle speed and said brake release vehicle speed, when the present vehicle speed detected by said vehicle speed detecting means is lower than the brake release vehicle speed stored in said brake vehicle speed memory means, the speed change target value is obtained from the target engine speed.

3. A speed change control device according to claim 2, wherein the brake correction amount is previously set in correspondence with the difference between said present vehicle speed and said brake release vehicle speed.

4. A speed change control device according to claim 2, the brake correction amount is determined in the case where the road is a down-hill road.

5. A speed change control device according to claim 2, wherein, in the case where the fact that the brake is operated is detected by said brake operation detecting means, and the fact that a throttle is substantially fully closed is detected by said throttle opening degree detecting means, the brake correction amount is determined in a predetermined value, and the speed change target value is obtained by adding the brake correction amount into the target engine speed.

6. A speed change control device for a vehicular continuously variable transmission which transmits the output of an engine thus changed to drive wheels in a state of a continuously variable change speed, said control device comprising:

a vehicle speed sensor detecting a vehicle speed;

a throttle opening degree sensor detecting a throttle opening degree;

a brake sensor detecting a brake operation;

a release vehicle speed memory which, when the brake operation is detected by said brake sensor, renews and stores the vehicle speed as a brake release vehicle speed which is detected by said vehicle speed sensor when the brake is operated; and a gradient sensor detecting the gradient of a road on which a vehicle runs, wherein, in the case where the fact that the brake is not operated is detected by said brake sensor, and the fact that a throttle is substantially fully closed is detected by said throttle opening degree sensor, when the present vehicle speed detected by said vehicle speed sensor is higher than the brake release vehicle speed stored in said release vehicle speed memory, a speed change target value is obtained according to the difference between said present vehicle speed and said brake release vehicle speed, and to the road gradient detected by said gradient sensor, and in the same case, when the present vehicle speed detected by said vehicle speed sensor is lower than the brake release vehicle speed stored in said release vehicle speed memory, the speed change target value is obtained according to the road gradient detected by said gradient sensor, and speed change control is carried out so as to obtain the speed change target value.

7. A method for controlling a speed change of a vehicular continuously variable transmission which transmits the output of an engine thus changed to drive wheels in a state of a continuously variable change speed, said method comprising the steps of:

determining whether or not a road on which a vehicle runs is a down-hill road;

determining whether or not a throttle opening degree is opened;

determining whether or not a brake is operated;

calculating the difference between the present vehicle speed and a brake release vehicle speed being a vehicle speed which is detected when the brake is operated, in the case where the brake is not operated and a throttle is substantially fully closed;

obtaining a speed change target value according to the difference between the present vehicle speed and the brake release vehicle speed, and to a road gradient, when the present vehicle speed is higher than the brake release vehicle speed in the same case; and controlling the speed change to obtain the speed change target value.

* * * * *